2,913,486
METHOD FOR THE PREPARATION OF ESTERS OF UNSATURATED ALIPHATIC ACIDS

Franklin Veatch, Lyndhurst, and James D. Idol, Jr., Shaker Heights, Ohio, assignors to The Standard Oil Company, Cleveland, Ohio, a corporation of Ohio No Drawing. Application July 7, 1958
Serial No. 746,646

9 Claims. (Cl. 260—486)

The present invention relates to a method for the preparation of unsaturated aliphatic esters from unsaturated aliphatic nitriles. More particularly, this invention is concerned wtih a method for the preparation of alkyl esters of acrylic acid from acrylonitrile.

The manufacture of unsaturated aliphatic esters from unsaturated aliphatic nitriles has been proposed heretofore. For example, several processes are known by means of which the alkyl esters of acrylic acid are produced from acrylonitrile. These methods involve a two-step reaction. In the first step acrylonitrile is reacted with a strong mineral oxyacid in the liquid phase. The second step of the process involves the addition of an alcohol to the acrylonitrile-acid reaction product with the resultant formation of an alkyl acrylate.

We have now discovered that alkyl esters of acrylic acid may be produced directly from acrylonitrile in a one-step process. This discovery is most surprising and unexpected since the art suggests that a one-step process is not feasible. Briefly stated, the process of our invention involves the vapor phase reaction of a mixture of an alcohol, acrylonitrile and water in the presence of an esterification catalyst. As the nitrile to be employed in our process we prefer to use acrylonitrile, but other nitriles such as methacrylonitrile may also be advantageously employed. Depending upon the product desired, any of the lower aliphatic alcohols may be employed. For example, methanol, ethanol, propanol, butanol and their homologues may be employed. Methanol and ethanol, in particular, will give equivalent results in the process of this invention.

The molar ratio of the nitrile to the alcohol is in no way critical and any ratio is operative. However, at the operating temperatures of this process most alcohols will have a tendency to undergo dehydration. Consequently, it is advantageous to have the alcohol-nitrile ratio as low as possible to minimize the formation of ethers and/or the corresponding olefins.

The presence of water during the reaction is vital to the invention and preferably the molar ratio of water to nitrile should be about 1. However, other ratios are operable and, in general, a ratio in the range of about 5:1 to about 1:1 will give good results. Water appears to suppress the formation of ethers and olefins from the alcohol as discussed above and it appears to have other beneficial effects which are not fully understood at this time.

In general, the process may be conducted at temperatures in the range of 400 to 800° F. The optimum temperature range seems to be about 600 to about 650° F. The reaction may be carried out at atmospheric pressure with good results, but slightly increased pressures are also operable; and, in fact, increased pressures tend to favor the desired reaction. However, in order to minimize polymerization of the reactants and products, the pressure should not exceed more than about 5 atmospheres.

As the catalyst which is used in connection with the process of this invention, we prefer to employ silica. However, any solid material that remains solid under the reaction conditions and which is useful as an esterification catalyst may be employed. For example, silica, silica alumina, titania, zirconia, thoria and the like have been found to be suitable. In some cases the catalyst may be enhanced by the addition of small amounts of acids such as phosphoric or molybdic acid. In still other instances it may be desirable to include as ingredients of the catalyst metals which promote oxidation, as for example, platinum, nickel, iron, copper, silver and the like. It appears that the latter ingredients will prevent to some extent the fouling of the catalyst, particularly in those cases where a small amount of air is introduced with the other reactants in the process.

The contact time necessary to effect the desired reaction time may be as low as 5 seconds, but the best results are obtained with contact times of about 20 seconds to about 40. Contact time is defined as follows:

$$\text{Contact time} = \frac{\text{Apparent volume of catalyst}}{\text{Volume rate of feed}}$$

In general, contact times above about 40 seconds offer no advantage.

The process may be carried out in any conventional catalytic apparatus. For example, it is possible to conduct the process in a vessel having a fixed catalytic bed. Likewise, it is possible to conduct the process in a vessel having a fluidized bed. In the latter instance it may also be desirable to provide separate catalyst regeneration facilities and as it is contemplated that a fluidized catalyst could be continuously circulated from the reaction vessel to a regenerator and back to the reaction vessel.

The products of the reaction are recovered from the reaction vessel by conventional methods. For example, the reactor effluent gases may be scrubbed with water to recover the desired esters. In the latter instance, it may be desirable to include a small amount of a polymerization inhibitor such as hydroquinone in the water solution. Similarly, the addition of a small amount of an acid such as hydrochloric to the scrubbing solution will facilitate product recovery. We also contemplate that unreacted feed materials may be recovered and recycled to the reaction zone.

The following examples illustrate the improvements which are made possible by the present invention. Example I represents a preferred embodiment of this invention.

Example I

A feed was prepared having the following composition:

| Component: | Mole percent |
|---|---|
| Acrylonitrile | 33 |
| Methanol | 33 |
| Water | 33 |

The feed mixture was preheated to 600° F. and passed over 500 grams of silica gel (30–100 mesh) in a stainless steel reactor. The contact time in the reactor was 33 seconds. The products of the reaction were recovered by a counter-current scrubbing with a 1% aqueous solution of hydrochloric acid. Gas chromatographic analysis of the recovered material revealed that 12% of the nitrile was converted to methyl acrylate.

Example II

This run was a duplicate of Example I except that the silica gel was impregnated with 10% $P_2O_5$. Analysis of the recovered material showed that 14.6% of the nitrile was converted to methyl acrylate.

It will be obvious to those skilled in the art that many modifications of the process described herein may be made without departing from the spirit or scope of the invention. Accordingly, we desire this application for Letters Patent to cover all such modifications as would reasonably fall within the scope of the appended claims.

We claim:

1. A process for the preparation of unsaturated aliphatic esters comprising the step of contacting in the vapor phase and at an elevated temperature in the range of about 400 to 800° F. a mixture of a lower aliphatic alcohol, an unsaturated aliphatic nitrile selected from the group consisting of acrylonitrile and methacrylonitrile, and water with a solid esterification catalyst, said mixture containing sufficient water to provide a molal ratio of water to nitrile of at least about 1:1.

2. A process for the preparation of an alkyl ester of acrylic acid comprising the step of contacting a gaseous mixture comprising a lower aliphatic alcohol, acrylonitrile, and water with a solid esterification catalyst at an elevated temperature in the range of about 400 to 800° F., said mixture containing sufficient water to provide a molal ratio of water to nitrile of at least about 1:1.

3. A process for the preparation of methyl acrylate comprising the step of contacting a gaseous mixture comprising methanol, acrylonitrile, and water with a solid esterification catalyst at an elevated temperature in the range of about 400 to 800° F., said mixture containing sufficient water to provide a molal ratio of water to nitrile of at least about 1:1.

4. A process for the preparation of ethyl acrylate comprising the step of contacting a gaseous mixture comprising ethanol, acrylonitrile, and water with a solid esterification catalyst at an elevated temperature in the range of about 400 to 800° F., said mixture containing sufficient water to provide a molal ratio of water to nitrile of at least about 1:1.

5. A process for the preparation of unsaturated aliphatic esters comprising the step of contacting in the vapor phase and at an elevated temperature in the range of about 400 to 800° F. a mixture of a lower aliphatic alcohol, an unsaturated aliphatic nitrile selected from the group consisting of acrylonitrile and methacrylonitrile, and water with silica gel, said mixture containing sufficient water to provide a molal ratio of water to nitrile of at least about 1:1.

6. The process of claim 5 in which said lower aliphatic alcohol is methanol.

7. The process of claim 5 in which said lower aliphatic alcohol is ethanol.

8. The process of claim 5 in which said nitrile is acrylonitrile.

9. The process of claim 5 in which said elevated temperature is in the range of about 600° to 650° F.

References Cited in the file of this patent

UNITED STATES PATENTS 2,759,016     Metzger et al.     Aug. 14, 1956